United States Patent [19]
Harvey

[11] 3,715,959
[45] Feb. 13, 1973

[54] APPARATUS FOR PROVIDING SHUTTER RELEASE AND FOR INDICATING END OF A CONTROLLED TIME EXPOSURE

[75] Inventor: Donald M. Harvey, Webster, N.Y.

[73] Assignee: Eastman Kodak Company, Rochester, N.Y.

[22] Filed: Aug. 19, 1971

[21] Appl. No.: 173,196

[52] U.S. Cl............95/10 CT, 95/11 R, 95/53 EB, 95/60
[51] Int. Cl........G03b 7/08, G03b 9/16, G03b 17/18
[58] Field of Search.......95/10 C, 10 CT, 11 R, 53 R, 95/53 EA, 53 EB, 53.3, 59, 60

[56] References Cited

UNITED STATES PATENTS

| 3,421,427 | 1/1969 | Starp | 95/53 EA X |
| 3,245,332 | 4/1966 | Kagan | 95/53 EB |
| 3,479,935 | 11/1969 | Harvey | 95/10 CT |
| 3,418,910 | 12/1968 | Reutschler et al. | 95/53.3 |

Primary Examiner—Joseph F. Peters, Jr.
Attorney—W. H. J. Kline et al.

[57] ABSTRACT

Apparatus for actuating a camera shutter to uncover an exposure aperture, for actuating switch means, and for indicating the end of a controlled time exposure, including a shutter actuating member movable from a first position to a second position for actuating the shutter to uncover the exposure aperture. The shutter actuating member is retained in the second position during a controlled time exposure, and is released for return movement to the position in response to the actuation of the shutter to cover the exposure at the end of the controlled time exposure. The returning of the shutter actuating member to the first position indicates the end of the controlled time exposure.

5 Claims, 4 Drawing Figures

DONALD M. HARVEY
INVENTOR.

3,715,959

APPARATUS FOR PROVIDING SHUTTER RELEASE AND FOR INDICATING END OF A CONTROLLED TIME EXPOSURE

BACKGROUND OF THE INVENTION

1. Field of the Invention

This invention relates to improved apparatus for initiating exposure and for indicating termination of a timed exposure interval in a camera having a shutter mechanism providing a controlled time exposure.

2. Description of the Prior Art

Recent developments in the camera art have been directed to the total automation of film exposure control apparatus. Consequently, cameras are available which incorporate various forms of timing devices, such as electronic light measuring circuits, cooperating with shutter arrangements so that the shutter system is adjusted automatically. The controlled time exposure frequently lasts for several seconds, depending upon the scene illumination, and during these long exposure intervals it is extremely difficult not to transmit some motion to the camera. Transmitting motion to the camera is particularly a problem where the operator does not know the exact moment when the shutter mechanism closes to terminate the exposure. Several approaches have been used to indicate to the operator that the controlled time exposure has terminated. For example, in the case of electronically-controlled time exposure, there is often provided a light which is energized during exposure, and deenergized to indicate the end of the exposure interval.

The present invention is directed to a simple mechanism for providing an indication of the end of an exposure interval, that is useful with timing mechanisms of various forms, including both mechanical and electrical types.

SUMMARY OF THE INVENTION

It is therefore an object of the invention to provide an improved method and apparatus for indicating the end of the exposure cycle for controlled time exposures.

In one illustrative embodiment of the invention, a shutter actuating mechanism for use in a camera includes a shutter actuating member disposable a first to a second position including means for maintaining the depression of the shutter actuating member during the controlled time exposure, and means to effect release of the shutter actuating member at the end of the controlled time exposure so that it returns to the first position. The returning shutter release member is readily detected by the eye or touch of a camera operator and provides an indication of the end of the controlled time exposure.

In a specific embodiment of the invention the shutter actuating member, when moved to the second position, actuates a switch to provide electronic time control, and releases shutter means for initiating the exposure. The shutter means maintains the shutter actuating member in the second position during the controlled time exposure. Movement of the shutter means to terminate the exposure releases the shutter actuating member for movement to the first position.

BRIEF DESCRIPTION OF THE DRAWINGS

Other objects and advantages of the invention will become apparent from the following detailed description taken in conjunction with the accompanying drawings wherein.

DETAILED DESCRIPTION OF THE DRAWINGS

Because cameras are well known, the present description will be directed to elements forming part of, or cooperating more directly with the disclosed embodiment of the invention. Camera parts not specifically shown or described may take forms well known to those skilled in the art.

Figure 1:
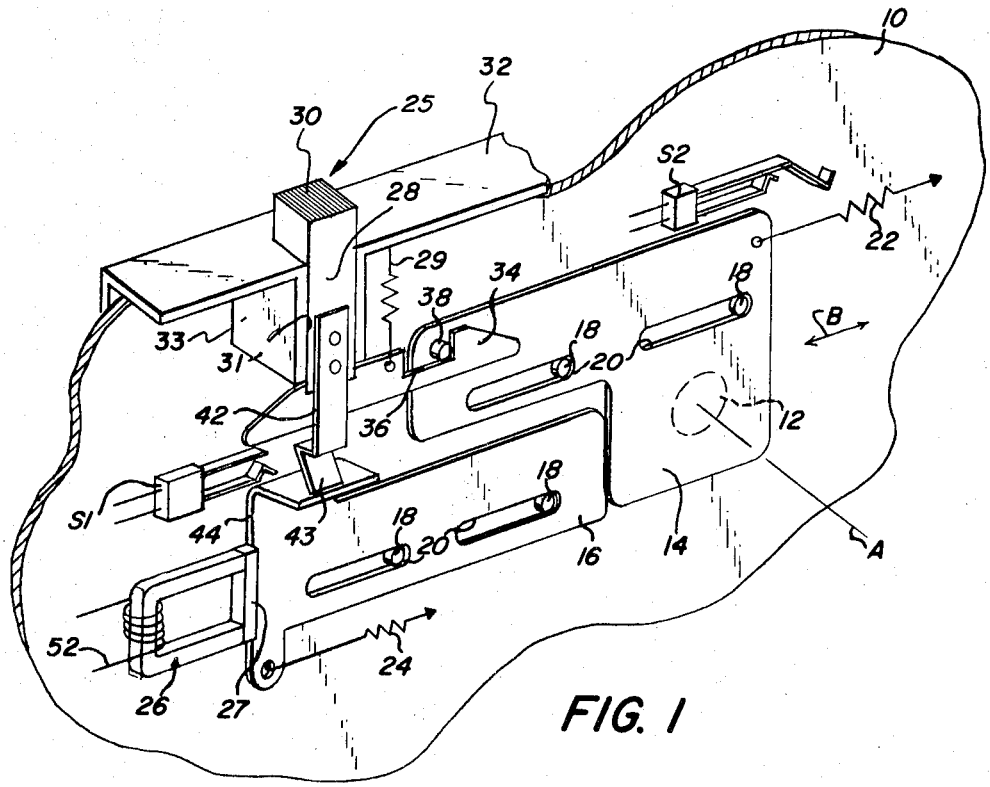
FIG. 1 is a perspective view of a shutter mechanism, incorporating a shutter actuating member, shown in the cocked position of the shutter mechanism and the normal position of the shutter actuating member.
Figure 2:
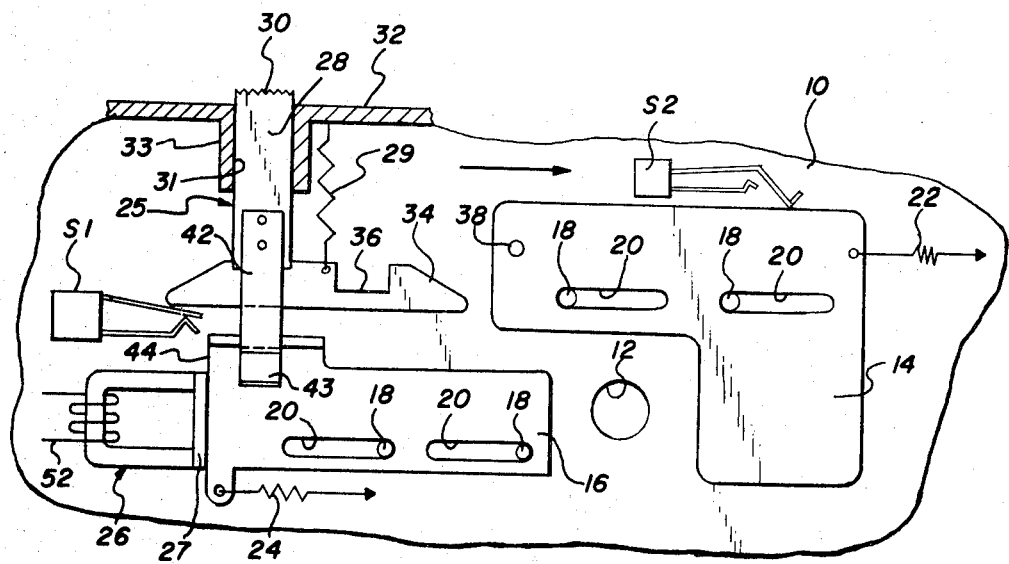
FIG. 2 is an elevational view of the shutter mechanism of FIG. 1, in the uncocked position, showing the shutter actuating member depressed and engaging a closing shutter blade during the controlled time exposure.
Figure 3:
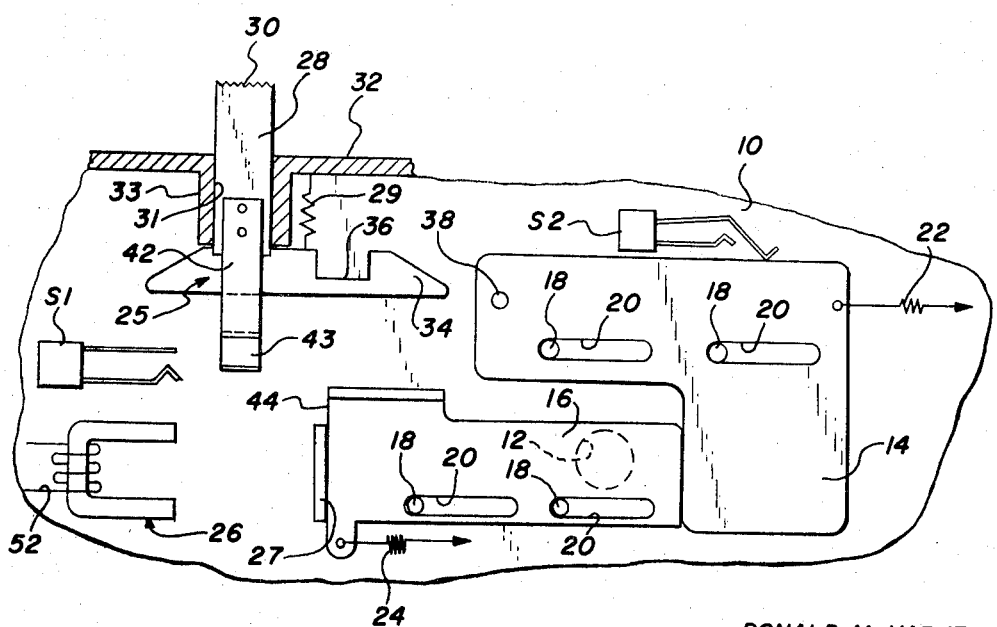
FIG. 3 is an elevational view of the shutter mechanism of FIGS. 1 and 2, at the end of the controlled time exposure, when the closing shutter blade releases the shutter actuating member for movement to the normal position.

Referring now to the drawings, and in particular to FIG. 1, one embodiment of the invention is shown in cooperation with a shutter mechanism mounted on a camera structure 10. The camera structure 10 defines an exposure aperture 12, aligned with a camera exposure axis, indicated by the line A, through which scene illumination passes during exposure. The shutter mechanism includes an opening shutter blade 14 and a closing shutter blade 16, each defining a pair of elongated slots 20 for receiving a pair of pins 18 secured on the camera structure 10. Each of the shutter blades 14 and 16 is movably mounted by means of the associated pins and slots for movement in the direction indicated by the arrow B, to uncover and cover the exposure aperture 12. In FIG. 1, the blade 14 is shown in its aperture blocking or closed position, and the blade 16 is shown in its open or aperture unblocking position. In FIG. 2 the blade 14 has moved laterally from the aperture blocking to the aperture unblocking position, and the aperture is exposed to incident scene light. FIG. 2 also shows a timing switch S2 which is actuated by the blade 14 upon the opening movement of the blade 14. FIG. 3 shows the blade 16 after lateral movement of the blade 14, to the aperture closing position for terminating the exposure of the aperture 12 to incident scene light.

The blade 14 is retained in a cocked, closed position as shown in FIG. 1, against the bias of a spring 22, by a shutter actuating mechanism 25, which is to be more fully described later. Prior to initiation of an exposure, the blade 16 is retained in a cocked, open position against the bias of spring 24 by engagement of a front end of the blade 16 with a back edge of the blade 16. After initiation of an exposure, the blade 16 is held by a device such as an electromagnet 26, which may be energized by a suitable electronic timing circuit, to be described later. When energized, the electromagnet 26 attracts a keeper 27 on the blade 16, and retains the blade 16 in the position shown in FIG. 2.

As further shown in FIG. 1 the shutter actuating mechanism 25 includes an elongated shutter actuating member 28, which may have a portion 30 accessible from the camera exterior for manual actuation, and which is received in a slot 31 formed in a camera housing 32. The member 28 is received within the slot 31 for axial movement, against the bias of a spring 29, from a first, or normal position as shown in FIG. 1, to a second, or release position as shown in FIG. 2. The member 28 is maintained in the position of FIG. 1, by means of an angular extension 34 engaging a downward extending wall structure 33 of the camera housing 32. The bias of the spring 29 maintains the extension 34 in engagement with the wall structure 33. The extension 34 is provided with a notch 36, which in the cocked position of the blade 14 shown in FIG. 1, engages a pin 38 on the blade 14, to retain the blade 14 in the cocked position against the bias of the spring 22. The extension 34 is also positioned in relation to a switch S1, so that initial axial movement of the member 28 actuates the switch S1 to a closed position. As further shown in FIG. 1, the member 28 is provided with a downwardly projecting latch member 42. The latch member 42 may be a resilient irregular leaf spring member 43, and when the member 28 moves axially against the bias of the spring 29 as shown in FIG. 2, the member 43 bends and snaps under a bent over portion 44 on the top of the blade 16. The shutter actuating mechanism 25 is thereby latched in its release position, against the bias of the spring 29.

Figure 4:
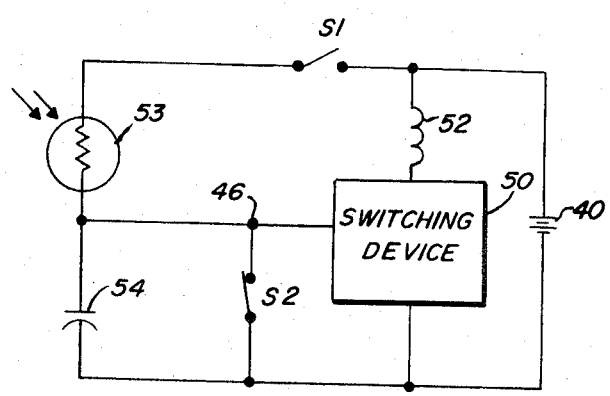
FIG. 4 is a schematic diagram of a suitable electronic circuit for use with the apparatus of FIG. 1.

The circuit shown in FIG. 4 is an example of timing means such as may be employed with the shutter mechanism of FIG. 1. In the disclosed embodiment the timing means comprises a conventional light-integrating, electronic circuit and includes a voltage source 40, a transistor switching device 50, an electromagnet coil 52, and a voltage integrating network including a photocell 53 connected in series with a capacitor 54 across the source 40. The capacitor 54 is shunted to ground by the integrating switch S2. The switch S2 is normally closed so that the capacitor 54 is normally completely discharged. Thus, when the switch S2 is opened, by the blade 14, as shown in FIG. 2, the voltage at a junction 46 between the photocell 53 and the capacitor 54 changes from its initial value in a period of time depending on the well known time constant "R–C" of the integrating network. The time constant depends upon the capacitance of the capacitor 54, and the resistance of the photocell 53, which may in one illustrative embodiment of this invention be a cadmium sulfide photocell, which has the property that its impedance varies inversely with the amount of light incident on the photocell. The junction 46 is connected to the input terminal of a switching device 50, which is adapted to conduct current through the coil 52 when the bias potential at the input is below a predetermined value, and to be nonconducting when its input exceeds that value. The switching device 50 is normally conducting when the switch S1 is closed, and when the switch S2 is opened, the voltage level at junction 46 begins to increase to a predetermined value to cause the switching device 50 to switch from its conductive state to its nonconductive state. The switching of the switching device 50 to its nonconductive state terminates the flow of current in the coil 52, and the electromagnet 26 becomes deenergized. When the electromagnet 26 becomes deenergized, the closing shutter blade 16 is released for movement, under the bias of the spring 24, to cover the exposure aperture 12. The switching device 50 as shown in FIG. 4, may be any of the various types of switching devices such as a Schmitt trigger circuit, which is well known in the art.

In operation of the shutter mechanism, the shutter actuating mechanism 25 is depressed, and the member 28 moves axially from the position of FIG. 1 to the position shown in FIG. 2. As the member 28 moves axially, the notch 36 disengages from the pin 38 and the blade 14 moves laterally under the bias of spring 22 to expose the aperture 12 to incident scene illumination, also shown in FIG. 2. Prior to release of the blade 14, axial movement of the member 28 brings the extension 34 into contact with the switch $S_1$, and closes the switch S1 for furnishing power to the circuit of FIG. 4. The circuit energizes the electromagnet 26 and the blade 16 is retained as the electromagnet 26 attracts the keeper 27. As further shown in FIG. 2, the lateral movement of the blade 14 opens the timing switch S2, initiating the controlled time cycle. Continued axial movement of the member 28 brings the member 43 of the latch member 42 into engagement with the bent over portion 44 of the blade 16, and the shutter actuating mechanism 25 is latched in its release position during the period that the blade 16 is in the cocked position. At the termination of the controlled time exposure, as determined by the circuit of FIG. 4, the electromagnet 26 becomes deenergized and the blade 16 is released for movement, under the influence of its bias spring 24, to a position covering the exposure aperture 12, as shown in FIG. 3. As further seen by reference to FIG. 3, the movement of blade 16 to a position covering the exposure aperture 12, results in release of the latch member 42 from the bent over portion 44. Under the influence of the spring 29, the member 28 returns to the normal position as the blade 16 closes. The return of the member 28 to the normal position indicates to the operator that the shutter mechanism has closed, and the controlled time exposure has been terminated.

The invention has been described in detail with particular reference to a preferred embodiment thereof, but it will be understood that variations and modifications can be effected within the spirit and scope of the invention.

I claim:

1. In combination with a camera having shutter means actuatable between open and closed conditions for uncovering and covering respectively an exposure aperture, means for moving said shutter means between said open and closed conditions, and means for retaining said shutter means in said open condition, improved shutter release apparatus comprising:

a member having a portion accessible from the exterior of the camera for manual actuation, said member being movable from a first to a second position upon actuation thereof, said member including first means for releasably retaining the shutter means in said closed condition when said member occupies said first position, and for releasing said shutter means to move to said open condition during actuation of said member toward said second position, said member including second means for releasably engaging said shutter means when said member occupies said second position, so that said member remains in said second position when said shutter means is in said open condition; and means for moving said member to said first position upon movement of said shutter means to said closed condition.

2. Apparatus as claimed in claim 1 wherein said member includes an elongated portion which is movable axially between said first and said second positions, said first means being disposed angularly from said portion and said second means comprising a resilient extension of said portion.

3. Apparatus as claimed in claim 1 wherein said camera includes an electronic timing circuit for providing an exposure interval related to the intensity of the scene light, said member being disposed to actuate said electronic circuit when said member is moved toward said second position.

4. In a camera having shutter control apparatus for establishing the duration of an exposure interval through an exposure aperture, the combination comprising:

a first shutter blade, movable between a first and second position in relation to the exposure aperture to block and unblock the exposure aperture respectively;

means urging said first shutter blade to its second position;

a second shutter blade, movable between first and second positions in relation to the exposure aperture to unblock and block the exposure aperture respectively;

means urging said second shutter blade to its second position;

an actuatable timing circuit, including photosensitive means disposed to receive scene light for providing an output signal at the end of the exposure interval, the length of the exposure interval being related to the intensity of scene light incident on said photosensitive means;

switch means for activating said timing circuit;

transducer means retaining said second shutter blade in its first position, said transducer means responsive to said signal for releasing said second shutter blade to permit movement of said second shutter blade to its second position; and a shutter actuating member, movable between a first and a second position, said member in said first position being located to retain said first shutter blade in said first position, said shutter actuating member being disposed to release said first shutter blade and actuate said switch means upon movement toward said second position, said shutter actuating member when in said second position being constructed and located to engage said second shutter blade wherein said shutter actuating member is releasably retained in said second position during the exposure interval and released to move to said first position upon movement of said second shutter blade to its second position.

5. Apparatus as claimed in claim 4 wherein said shutter actuating member includes a downward extending resilient member and said second shutter blade includes a bent-over portion, said resilient member disposed to engage said bent-over portion when said shutter actuating member is in said second position, said member being releasable upon movement of said second shutter blade to said closed condition, thereby permitting said shutter actuating member to move to said first position.

* * * * *